Figure 1:
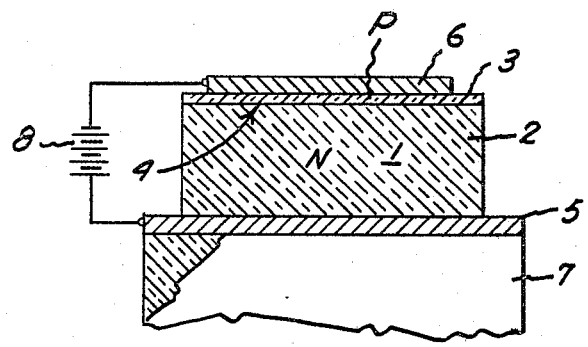

Inventors:
Dominic A. Cusano,
Richard L. Sormberger.
by John F. Ahern
Their Attorney.

United States Patent Office

3,330,983
Patented July 11, 1967

3,330,983
HETEROJUNCTION ELECTROLUMINESCENT
DEVICES
Dominic A. Cusano, Schenectady, N.Y., and Richard L. Sormberger, Springfield, Va., assignors to General Electric Company, a corporation of New York
Filed Nov. 9, 1964, Ser. No. 409,832
5 Claims. (Cl. 313—108)

This application is a continuation-in-part of our copending application, Ser. No. 208,082, filed July 6, 1962, now abandoned, which is in turn a division of our previously filed application Ser. No. 22,248, filed Apr. 14, 1960, now abandoned. The present invention relates to improved electroluminescent devices and, more particularly, to such devices incorporating a P-N junction therein.

Electroluminescence is that phenomenon wherein a semiconductive material known as a phosphor containing a proper impurity activator is subjected to an electric field with the resultant emission of visible light. Electroluminescence has been primarily an alternating voltage phenomenon, although direct current electroluminescence has been observed in certain single crystalline and other crystalline phosphor materials.

Although electroluminescence has achieved a certain status as a producer of low-brightness light for indicating and similar purposes, it has not achieved the wide acceptance to which it was initially believed entitled by virtue of low efficiency. Theoretically, the efficiency of electroluminescent light sources is higher than that of many light sources presently in commercial use. For some reason, however, the theoretical efficiency of electroluminescent sources has not been approached. One reason for the lack of efficiency in electroluminescent devices as presently utilized depends upon the mechanism of electroluminescence relied upon. This mechanism is generally known as collision or avalanche electroluminescence. In this type of electroluminescence, a voltage is applied to opposite terminals of an electroluminescent cell sufficient to cause some of the thermally excited electrons within the semiconductor or phosphor crystals to achieve sufficient energy to collide with so-called "luminescence centers" and excite these centers to cause the emission of visible light. The energy required by an electron to accomplish this is generally accepted as being approximately 3 ev. The electric field necessary to cause any appreciable proportion of free electrons to have this energy is approximately $10^4$ to $10^5$ volts per centimeter. This field strength is, however, relatively close to the breakdown strength of the phosphor substance. Thus, in order to avoid breakdown, it is necessary to limit the voltage applied to electroluminescent phosphor substances to such a low value that only a statistically small percentage of the available electrons are excited to a sufficient energy to cause the emission of light by "luminescence centers."

It has been thought that the phenomenon of recombination electroluminescence will be more efficient than collision electroluminescence. This mechanism operates when a P-type conduction carrier, an electron vacancy or "positive hole" and an N-type conduction carrier, or free electron, approach each other from opposite sides of a P-N junction and combine to annihilate each other with the emission of visible light. This mechanism requires the presence of a P-N junction. It has, however, been extremely difficult to form P-N junctions in phosphor materials, particularly because of the difficulty of imparting to luminescent phosphors as, for example, zinc sulfide, P-type conductivity characteristics.

Accordingly, one object of the present invention is to provide improved electroluminescent devices utilizing P-N junctions.

Another object of the present invention is to provide electroluminescent cells that utilize the mechanism of recombination electroluminescence.

In accord with the present invention, I provide electroluminescent cells in the form of adjacent P and N-type regions with a pair of non-rectifying electrodes connected to each region. The N-type region is composed of a zinc sulfide-type compound while the P-type region is composed of a region of originally a zinc sulfide-type compound which has been converted to a compound of the I–VI type which exhibits P-type conductivity characteristics.

In accord with one feature of the present invention, the P-type region is extremely thin and the junction between it and the N-type region is biased in the reverse direction to provide a collision type electroluminescent device.

Figure 2:
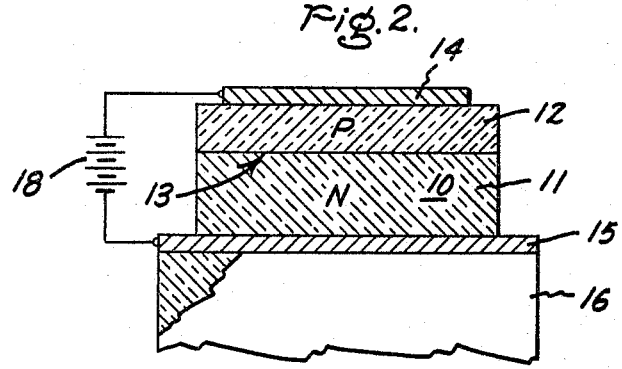

The novel features believed characteristic of the present invention are set forth in the appended claims. The invention, itself, together with further objects and advantages thereof, may best be understood by reference to the following description taken in connection with the appended drawing in which:

FIGURE 1 is a schematic illustration in partial vertical cross section of a collision type electroluminescent device constructed in accord with the present invention; and, FIGURE 2 is a schematic type partial vertical cross-sectional view of a recombination radiation type electroluminescent device constructed in accord with another feature of the present invention.

In FIGURE 1 of the drawing, a collision excitation electroluminescent device represented generally as 1 includes a region 2 of a II–VI phosphor substance such as any member of the zinc-cadmium sulfo-selenide family of phosphors including zinc sulfide, cadmium sulfide, zinc selenide, cadmium selenide, zinc-cadmium sulfide, zinc-cadmium selenide, zinc-cadmium sulfo-selenide, zinc sulfo-selenide, cadmium sulfo-selenide, zinc oxide and mixtures thereof which exhibits N-type characteristics. Contiguous with N-type region 2 is a P-type region 3 which is separated therefrom by an extremely thin P-N junction 4. P-type region 3 is a compound having a cation selected from Group I–b of the Periodic Table, preferably copper, and has the same anion as N-type region 2, namely an element of group VI–b of the Periodic Table of the elements other than polonium. A conducting electrode which may, for example, be a thin layer of indium, silver or other metals, tin oxide or reduced titanium dioxide 6 is in contact with the exterior surface of P-type region 3 and a thin electrically conductive electrode 5 which may, for example, be indium, reduced titanium dioxide or tin oxide is in contact with the opposite surface of N-type region 2. For ideal operation, however, electrode 6 is preferably a metal which makes non-rectifying contact with layer 3. It is desirable, if light is to be viewed from a direction normal to the P-N junction, that at least one of electrodes 5 and 6 be transmissive to the wavelength light emitted by the device. The remaining side may be light-transmissive or may be reflecting to concentrate all emitted light through one face of the device.

Electroluminescent device 1 may conveniently be fabricated upon a glass plate 7. This may be done by suspending plate 7 horizontally within an evacuated bell jar and producing thereupon first a layer of titanium dioxide and then a thin transparent homogeneous phosphor layer of a substance having a cation in group II–b, other than mercury, of the Periodic Table and an anion in group VI–b, other than polonium, of the Periodic Table, substantially as disclosed in United States Patent No. 2,685,530 to D. A. Cusano and F. J. Studer. Appropriate impurities may be incorporated, if necessary, to give the region N-type characteristics. This practice insures that conducting layer 5 is transparent to visible light. Conveniently, the glass plate having thereupon the phosphor layer may then be immersed in a suitable bath containing a solute which will replace the cation of the phosphor substance in the crystal lattice thereof in the exposed surface adjacent region to produce a surface-adjacent region of a Group I–b–Group VI–b P-type semiconductive material such as cuprous sulfide, cuprous selenide or the like. Preferably, the plate is submerged in a bath in which the replacing metallic ion is present in the monovalent state. For a fuller description of the formation of surface-adjacent regions of a P-type semiconducting layer as is utilized in the production of device 1, reference is hereby made to our United States Patent No. 3,095,324, filed Apr. 14, 1960, and issued June 25, 1963, the disclosure of which is incorporated herein by reference. It is to be noted that the entire composite semiconductor region between the electrodes in this, and the other embodiments of the invention is formed from the original film of the Group II–b–Group VI–B compound, the N-type region being of that compound and the P-type region being formed by a substitution of Group I–b atoms in the crystal lattice for Group II–b atoms. The crystal structure remains, however, and there are not discontinuities therein, thus facilitating the free and unimpeded flow of negative or positive conduction carriers through the semiconductor layer. This is a necessary condition in the operation of all embodiments of the invention.

It is particularly noted that discontinuities in the crystal structure of the device, such as grain boundaries, interstitial spaces or randomly oriented crystals make it impossible to achieve this condition. Such defects cause random field effects within the device which destroy the required smooth carrier flow and may reduced the field at the junction to such a low value that electroluminescence cannot be achieved. Therefore, the crystal structure must be continuous throughout the device and the electrical properties must be homogeneous, except, of course, for the difference due to P or N properties of the respective regions and the junction. In other words, although there may be more than one crystal in the makeup of the device, the total structure must be such as to allow continuity of carrier flow. This cannot be achieved in devices including many randomly disposed, spaced crystals such as occur in powders or pressed or sintered bodies. Devices prepared by the described method, although they may comprise more than one crystal, have been found to meet these conditions. These devices are structurally continuous, crystalline and, within the respective regions, electrically homogeneous.

After the N-type and P-type regions of the electroluminescent device 1 have been formed, a thin layer of indium, tin, silver, aluminum or another suitable metal may be formed upon the exterior surface of P-type region 3 by evaporation, spraying or other suitable techniques. Terminals are then connected to conducting electrodes 5 and 6. A unidirectional or alternating voltage may then be applied thereto for the production of high intensity light by collision excitation electroluminescence. If a unidirectional voltage source is utilized, the negative polarity thereof should be connected to metallic electrode 6 to bias the P-N junction 4 in the reverse direction. A P-N junction may be said to be biased in the reverse direction when the polarity of the voltage is such that the same polarity is applied to each region as is possessed by minority charge carriers therein. The biasing of the device is essential for unidirectional voltage operation, since the device only operates as a collision electroluminescent device when biased in the reverse direction. When alternating current is utilized, the device only operates during the cycle when the negative polarity is applied to the P-type region and the P-N junction is biased in the reverse direction.

The improved operation of the collision excitation electroluminescent device of FIGURE 1 is due to the creation of an exhaustion barrier and a steep potential gradient in the region of the N-type region of the phosphor immediately adjacent to P-N junction 4. If there were no P-N junction present and no P-type region, and if nonrectifying contacts were made to either side of an N-type zinc sulfide-type phosphor compound, the voltage gradient throughout the phosphor would be substantially uniform throughout and, as described hereinbefore would have to be of such a low value as to avoid voltage breakdown of the phosphor. By virtue of this requirement, it would be impossible to impart sufficient energy to enough thermal electrons to cause a high proportion thereof to cause collision excitation of luminescent center. In accord with the present invention, however, the voltage gradient throughout the N-type phosphor is concentrated at the region of the P-N junction by virtue of the creation of an exhaustion layer. This exhaustion layer is created because when voltage is initially applied, the electrons present in the region of the P-N junction are withdrawn therefrom causing a highly positive remainder charge. Since the P-type semiconductive region 3 is only a moderate conductor of electricity, electrons may not be drawn directly therethrough from cathode electrode 6 at a sufficient rate to immediately replace the withdrawn electrons. This causes the region to remain positively charged and causes a concentration of the voltage gradient therein. In this region of concentrated voltage gradient, the energy imparted to individual electrons which do enter from the P-type region is much greater than that which could be imparted thereto if the voltage gradient were uniform throughout. Accordingly, a high percentage of the electrons present in this region are given sufficient energy to cause the excitation of luminescent centers and a high efficiency of electroluminescent emission results.

The creation of the exhaustion layer depends on the thickness of the P-type region 3. This region must be thick enough to prevent passage of electrons until the necessary voltage gradient is produced and thin enough to allow passage of electrons thereafter. This is accomplished when the thickness of region 3 is greater than the De Beye length for the N-type material and not substantially greater than the electron diffusion length of the P-type material.

The De Beye length for a particular material is a measure of the penetration of the electron cloud of the metallic electrode into the semiconductor. Specifically, this length is given by the equation $$L = \left(\frac{KV_T}{2\pi N}\right)^{1/2} = 2.5 \times 10^3 \text{ cm.}$$

where:
$K$ = the dielectric constant of the II–b–VI–b material
$N$ = the density of charge near the surface of the semiconductor and $$V_T = \frac{kT}{e}$$

where:
$k$ = Boltzmann's constant
$T$ = the temperature, and
$e$ = the electronic charge.

Thus, if the thickness of the region 3 is greater than the De Beye length, the possibility of an ohmic contact through region 3 is prevented and, since the P-type region is only a moderate electron conductor, the necessary voltage gradient arises. It has been found that a thickness greater than 3 times the De Beye length is to be preferred since, if the thickness is less than this value, sufficient electrons may pass through to reduce the voltage gradient to a marginal value.

The electron diffusion length in the I–b–VI–b material is that of a minority charge carrier. If the region 3 is substantially thicker than this length, so that most electrons do not get through, those which do will not produce observable collision electroluminescence. Accordingly, the upper limit on the thickness of the region 3 is that it not be substantially greater than the diffusion length. The phrase not substantially greater, in this case, may refer to approximately 1½ times the diffusion length although the particular value in a given case depends on the sensitivity of the observation means and on the desired light output.

For most I–b–VI–b materials, these criteria define a range of from 25 angstrom units to 1000 angstrom units. The exact value in any case depends on the material, the materials therein and the applied voltage.

Although the phosphor from which N-type region 2 may be fabricated can be any of the conventional zinc cadmium sulfo-selenide phosphors and may be activated and coactivated with any of the conventional luminescent activators as, for example, copper and silver activators, chlorine, bromine, iodine, indium, gallium and aluminum coactivators, it has been found that unidirectional or D-C electroluminescence is of superior efficiency when the metallic activator utilized therein is manganese, arsenic, antimony or phosphorus and the coactivator utilized therein is chlorine. If alternating current excitation is utilized, a conventional Group II–b–Group VI–b electroluminescent phosphor with any of the conventional activators in conventional proportions may be utilized, although manganese and chlorine activated phosphors are superior in this instance.

N-type region 2 in the device of FIGURE 1 may conveniently be made to be approximately 10 microns thick. The bath in the modifying solution is maintained for only a short time so as to cause P-type region 3 to have a thickness that is just sufficient to increase the resistance between N-type region 2 and metallic electrode 6 enough to cause the creation of an exhaustion layer in region 2 adjacent junction 4. Such a thickness may conveniently be approximately 30 A.U. Under these conditions the P-N junction 4 is approximately only 10 A.U. in thickness. These thicknesses are ideal for the production of high intensity electroluminescent emission by a collision excitation phenomenon. Since the entire phosphor between electrodes 5 and 6 is only approximately 10 microns thick, the voltage required need only be approximately 100 volts.

In FIGURE 2 of the drawing, there is illustrated an electroluminescent device denominated generally as 10 which is ideally suited for high intensity, high efficiency electroluminescence light emission by a recombination radiation excitation mechanism. In FIGURE 2, device 10 includes an N-type region 11, a P-type region 12, a P-N junction 13, and a pair of conducting electrodes 14 and 15 at least one of which is preferably transparent. Preferably, the device of FIGURE 2 is formed upon a glass plate 16 in the manner described with respect to the formation of the device of FIGURE 1. This device is preferably thinner, however, and the initial II–b–VI–b compound layer may conveniently be approximately 5 microns thick. Similarly, after transparent conducting electrode 15 and N-type Group II–b–Group VI–b phosphor region 11 have been formed, the surface adjacent region 12 of the phosphor is transformed into a Group I–b–Group VI–b, P-type semiconductive material by bathing in a suitable bath containing ions of a metal of Group I–b of the Periodic Table, but preferably monovalent copper ions, to produce a P-type semiconductive material, preferably cuprous sulfide ($Cu_2S$) of the Group I–b–VI–b type. As compared with the carrying out of the process with respect to the device of FIGURE 1, in forming the device of FIGURE 2, the bathing is carried out for a sufficient length of time to cause the formation of a layer 12 of P-type semiconductor of substantial thickness.

The thickness of layer 12 is greater than that of layer 3 in FIGURE 1 since there is no need to merely impose a resistive layer. Rather the layer is made thick to satisfy two general criteria. Since radiation in this embodiment depends upon recombination, it is important that all injected minority charge carriers have an opportunity to recombine. Since the "diffusion length" of a minority charge carrier in a semiconductor, $$L_{N(p)} = \sqrt{\mu \tau \left(\frac{KT}{e}\right)}$$

where:

$L_{N(p)}$ is the diffusion length of an electron (positive hole) in centimeters $\mu$ is the mobility of an electron (positive hole) in square centimeters/volt-sec $\tau$ is the lifetime of an electron (positive hole) in secs K is the Boltzman constant T is absolute temperature (° K.)

e is the electronic charge $\left(\frac{KT}{e}\right)$ is in electron volts (ev)

is the statistical length a minority charge carrier travels before recombination, layer 12 should be greater than one minority carrier diffusion length. In the II–VI and I–VI compounds about 1 or 2 microns thickness is sufficient. Both layers 11 and 12 should be at least this thick. Additionally each layer should be thick enough to allow for the inclusion therein of sufficient impurity centers to serve as recombination sites. This results in the formation of a P-N junction 13 which may have a thickness as great as ½ to 1 micron.

The formation of this P-type phosphor is, like the formation of the P-type semiconductive layer in the device of FIGURE 1, carried out in accord with the process disclosed and claimed in our aforementioned United States Patent No. 3,095,324. A suitable conducting electrode 14, preferably metallic, which makes a good non-rectifying contact to P-type region 12 is formed upon region 12 by evaporation, spraying or other suitable methods to form a conducting electrode for the device. Silver and copper and like metals may serve this function.

In operation, the electroluminescent device 10 is connected to a suitable source of unidirectional or alternating voltage. If a direct current voltage is utilized, it is connected with the negative terminal connected to conducting electrode 15 and the positive terminal connected to conducting electrode 14 so as to bias P-N junction 13 in the forward direction. Forward bias is the opposite bias, described hereinbefore. When a voltage of from 5 to 10 volts is applied between electrodes 14 and 15 high-intensity high-efficiency light emission occurs at the P-N junction. The mechanism by which this light is emitted is of substantially as follows:

Positive conduction carries which are electron vacancies or "positive holes" are injected into the P-type region from the metallic electrode 14, while negative conduction carriers or electrons are injected into the N-type region 11 from electrode 15. These conduction carriers migrate to the P-N junction and the electrons and holes recombine with one another with the emission of visible light. The actual recombination occurs at impurity centers due, on the N-type side of the junction, to impurity activators present in the zinc sulfide-type compound as, for example, at copper sites and on the P-type side of the junction at impurity centers caused by excess atom vacancies in the Group I–b–group VI–b compound, as, for example, at copper vacancies in a $Cu_2S$ P-type region.

The color of the light emitted by electro-luminescent device 1 and 10 may be changed by varying the constituents of the host phosphors or by varying the activator. Thus, for example, cadmium in the cation of the host phosphor of the N-type material tends to favor a reddish emission, as does the use of selenium in the anion of the N-type material. Likewise, copper activator in the N-type material tends to favor the emission of green light whereas silver activator tends to favor the emission of blue light and manganese activator tends to favor the emission of yellow light. Since the voltage applied to cell 10 need not cause acceleration of high energy electrons, as in cell 1, but, rather, need only cause electrons and "positive holes" to migrate to the juntion, for a device 5 microns thick, luminescence may be obtained with an applied potential of 10 volts or less.

While the invention has been set forth herein with respect to certain embodiments thereof, many changes may readily occur to those skilled in the art. Accordingly, by the appended claims we intend to cover all such modifications and changes as fall within the true spirit and scope of the invention.

What we claim as new and desire to secure by Letters Patent of the United States is:

1. A electroluminescent device comprising: a structurally continuous crystalline semiconductive body including an electrically homogeneous region of a compound comprising a cation selected from the group consisting of zinc and cadmium and an anion selected from the group consisting of oxygen, sulfur, selenium and telleurium and exhibiting N-type characteristics, an electrically homogeneous region of a compound comprising a cation selected from the group consisting of copper, silver and gold and an anion selected from the group consisting of oxygen, sulfur, selenium and tellurium and exhibiting P-type characteristics, and a P-N junction region therebetween; said regions including luminescence centers and being structurally arranged to produce electroluminescent radiation upon the application of a potential difference across said junction; a first conducting electrode in contact with said N-type region; and a second conducting electrode in contact with said P-type region.

2. A electroluminescent device comprising: a structurally continuous crystalline semiconductive body including an electrically homogeneous region of a compound comprising a cation selected from the group consisting of zinc and cadmium and an anion selected from the group consisting of oxygen, sulfur selenium and tellurium and exhibiting N-type characteristics, an electrically homogeneous region of a compound comprising a cation selected from the group consisting of copper, silver and gold and an anion selected from the group consisting of oxygen, sulfur, selenium and tellurium and exhibiting P-type characteristics, and a P-N junction region therebetween, the compounds of said P-type and said N-type region both having the same anion; said regions including luminescence centers and being structurally arranged to produce electroluminescent radiation upon the application of a potential difference across said junction; a first conducting electrode in contact with said N-type region; and a second conducting electrode in contact with said P-type region.

3. An electroluminescent cell comprising a pair of conducting electrodes having a structurally continuous crystalline body of semiconductive material therebetween, said body being comprised of an N-type region of a zinc sulfide-type compound and a region of a compound comprising a cation selected from the group consisting of copper, silver and gold and an anion selected from the group consisting of oxygen, sulfur, selenium and tellurium and exhibiting P-type characteristics, and a P-N junction therebetween, each of said regions making a non-rectifying contact with one of said electrodes, said P-type region being of a thickness greater than the De Beye length of said N-type compound at operating temperature and not substantially greater than the diffusion length of a minority charge carrier in said P-type compound at operating temperature so that when said junction is biased in the reverse direction, an exhaustion barrier is created on the N-type side of said junction said N-type compound including at least one activator impurity which forms luminescence centers for emitting radiation upon collision with electrons accelerated across said exhaustion barrier.

4. An electroluminescent cell as claimed in claim 3 wherein the thickness of said P-type region is in the range of from 25 angstrom units to 1000 angstrom units.

5. An electroluminescent cell comprising a structurally continuous crystalline semiconductive body including a region of a compound comprising a cation selected from the group consisting of copper, silver and gold and an anion selected from the group consisting of oxygen, sulfur, selenium and tellurium and exhibiting P-type characteristics, and a region of a compound comprising a cation selected from the group consisting of zinc and cadmium and an anion selected from the group consisting of oxygen, sulfur selenium and tellurium and exhibiting N-type characteristics, and a P-N junction therebetween; said P-type and N-type regions respectively including vacancies and impurity atoms which form luminescene centers; each of said P-type and said N-type regions having a thickness at least as great as the diffusion length at operating temperature of a minority charge carrier therein for enabling radiative recombination of electrons and holes traveling in said regions; a first conducting electrode in contact with said N-type region; and a second electrode in contact with said P-type region.

References Cited

UNITED STATES PATENTS

| 2,820,841 | 1/1958 | Carlson et al. | 317—237 |
| 3,018,426 | 1/1962 | Ruppel | 317—237 |
| 3,207,939 | 9/1965 | Mason | 313—108 |
| 3,270,235 | 8/1966 | Loebner | 313—108 |

OTHER REFERENCES

Fischer: "Injection Electroluminescences," Solid State Electronics, 1961, vol. 2, Pergamon Press, pages 232–234.

JAMES W. LAWRENCE, *Primary Examiner.*

R. JUDD, *Assistant Examiner.*